Oct. 3, 1961 W. P. SMITH 3,002,737
SADDLE CUTTING MACHINE
Filed Aug. 10, 1959 4 Sheets-Sheet 1
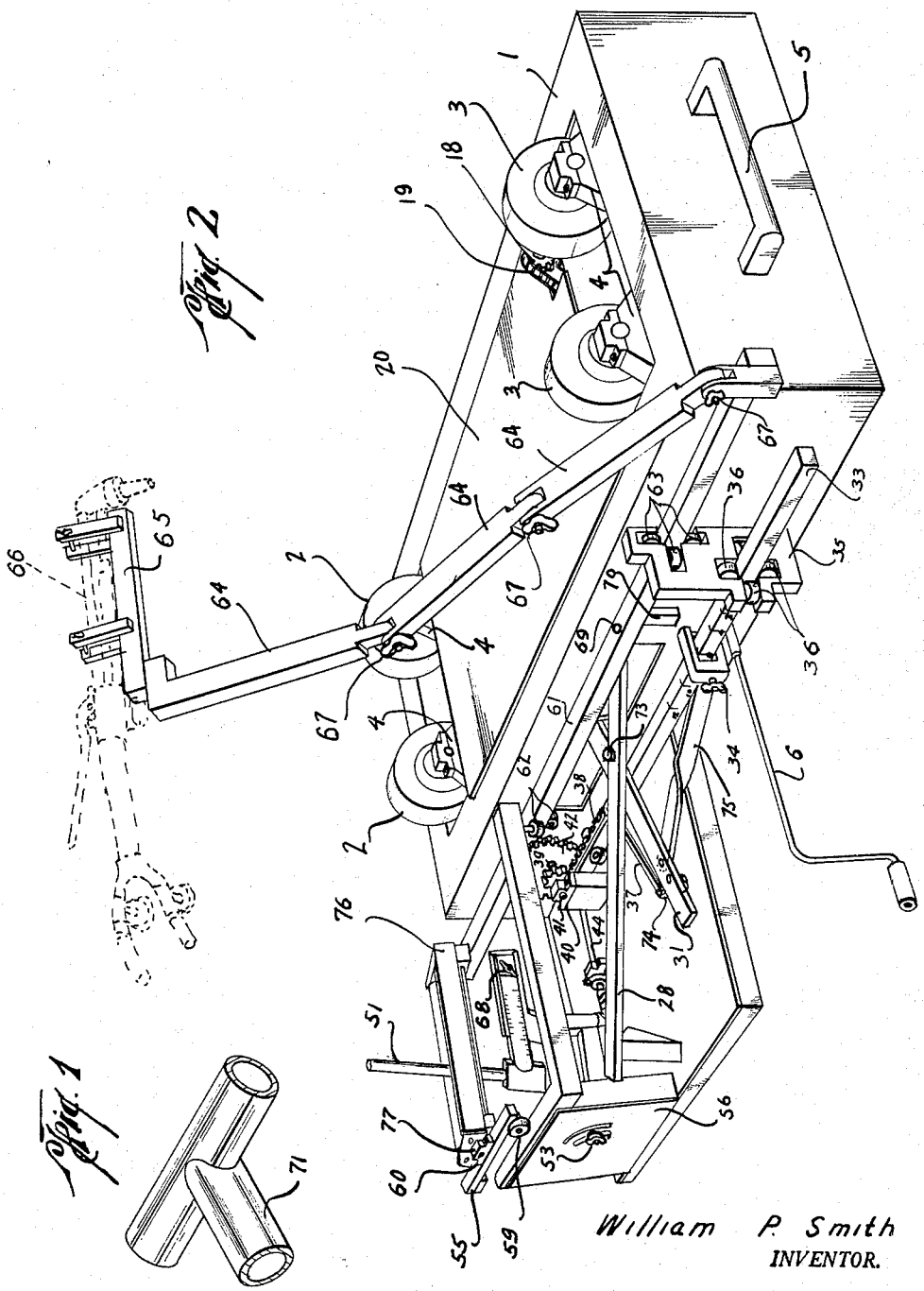
William P. Smith
INVENTOR.
BY Pamela O. Wyatt
ATTORNEY

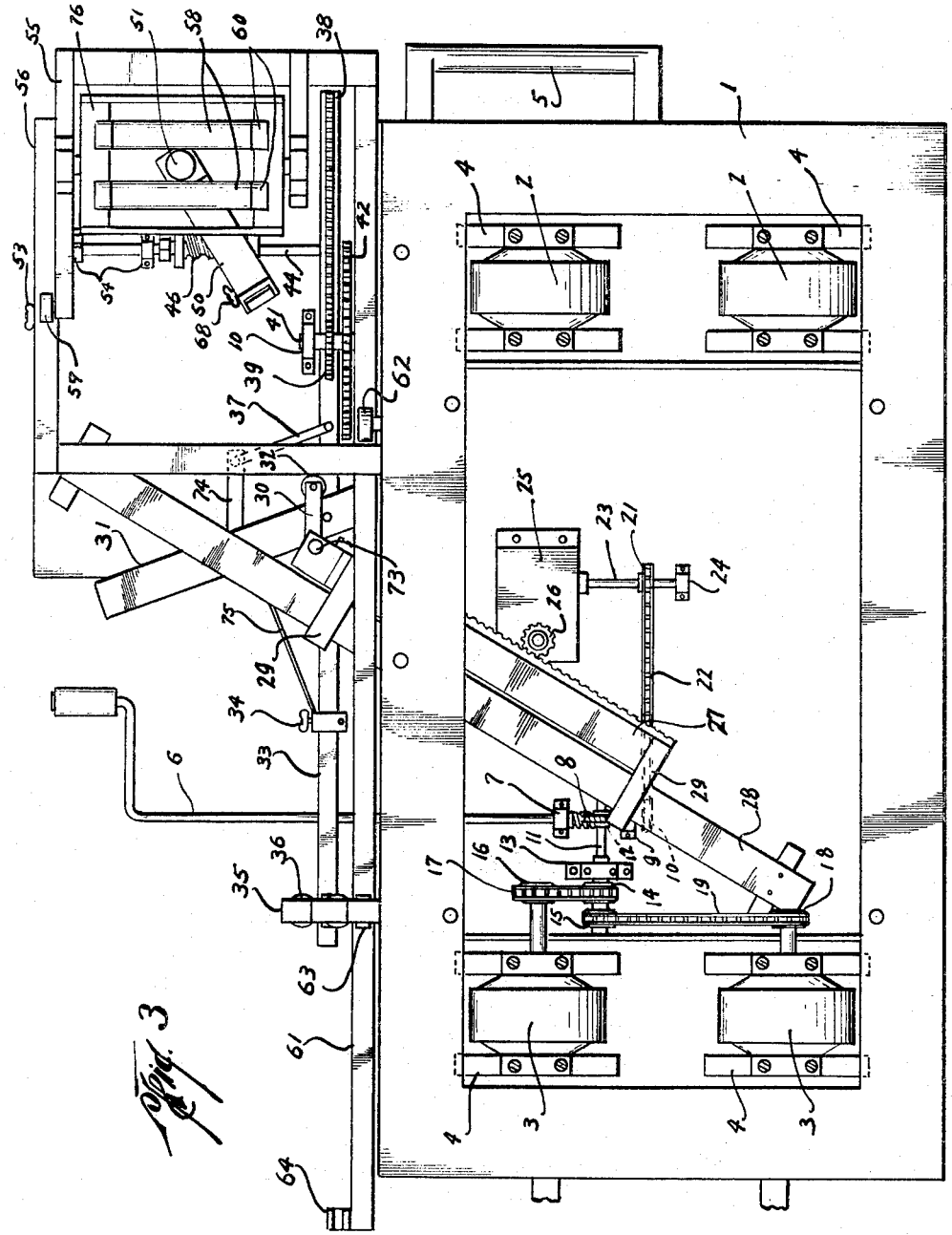

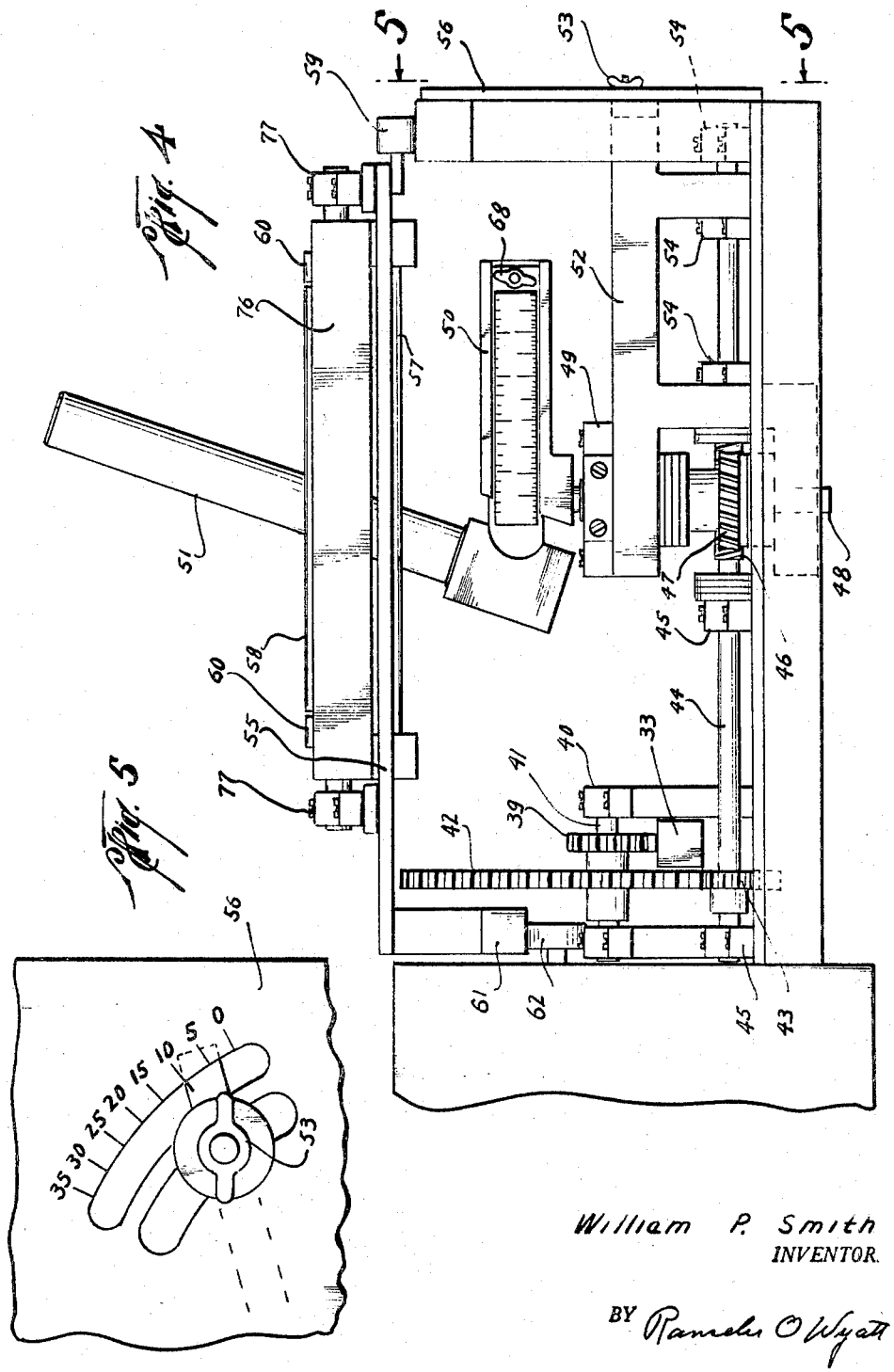

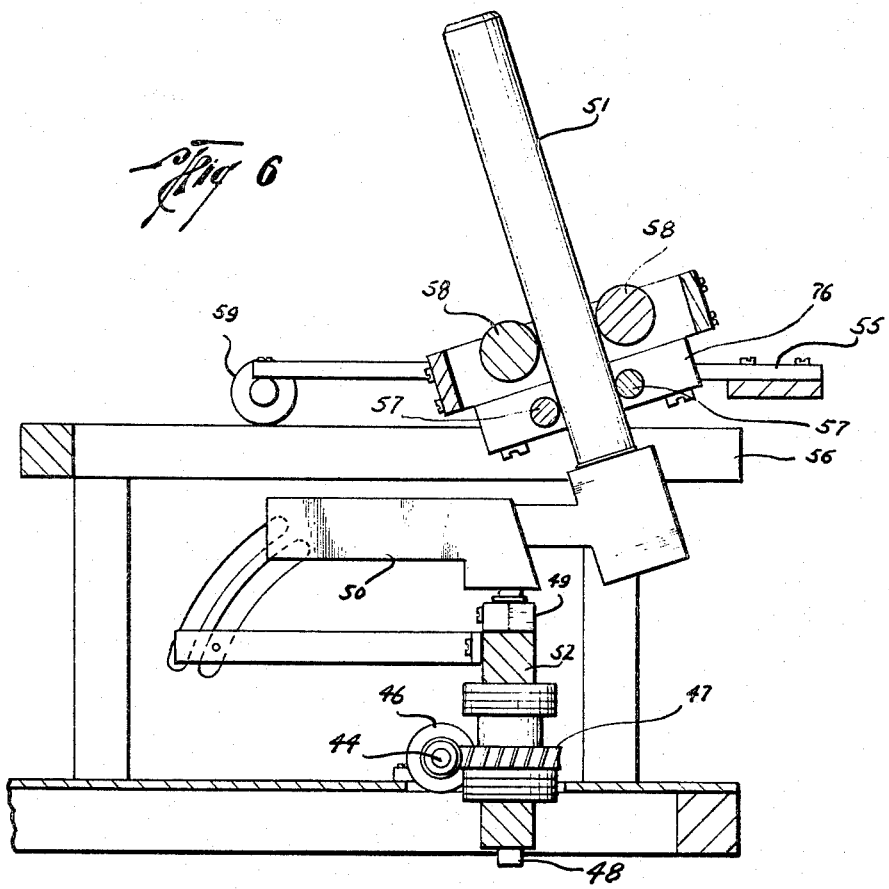
| SADDLE O.D. SIZE | 6" USE RADIUS | ON AND DEGREES |
|---|---|---|
| 6 5/8 | 1 1/16 | 36 |
| 8 5/8 | 5/8 | 16 |
| 10 3/4 | 3/8 | 8 |
| 12 3/4 | 3/8 | 7 |
| 14 | 5/16 | 7 |
| 16 | 5/16 | 7 |
| 18 | 1/4 | 7 |
| 20 | 1/4 | 7 |
| 24 | 1/4 | 6 |
| 26 | 3/16 | 6 |
| 28 | 3/16 | 6 |
| 30 | 1/8 | 6 |
| 36 | 1/8 | 6 |
William P. Smith
INVENTOR.
BY Pamela O. Wyatt
ATTORNEY

United States Patent Office 3,002,737
Patented Oct. 3, 1961

3,002,737
SADDLE CUTTING MACHINE
William P. Smith, 4015 Underwood, Houston, Tex., assignor of twenty-five percent to Joseph J. Hiller, Harris County, Tex.
Filed Aug. 10, 1959, Ser. No. 832,597
5 Claims. (Cl. 266—23)

This invention relates to new and useful improvements in a saddle cutting machine.

It is an object of this invention to provide a saddle cutting machine for use in making saddle cuts in tubular goods such as in joining one section of pipe to another at an intersection of ninety degrees, being readily portable so that the device may be carried or lifted by a single worker employed on the job, eliminating the necessity of prefabricating such connections, and having novel means for readily adjusting the device according to mathematical calculations set out in a table of settings to accomplish a proper cut back in the pipe based on the size of pipe being cut and the size of pipe to which the saddle is to fit.

It is another object of the invention to provide a portable saddle cutting device having means for manually rotating a section of pipe and forming a cutback or saddle therein to fit an opening to another pipe at an intersection of ninety degrees preparatory to joining the two pipes by welding.

It is still a further object of the invention to provide novel means for forming a saddle to a pipe having means for simultaneously rotating a pipe to be cut and oscillating a cutting torch in a predetermined pattern to form the desired cut back or saddle.

The common practice at the present time in field operations involving joinder of tubular material, is to form the saddle in the pipe to be joined, the cut-back of the saddle being determined by mathematical calculations taken from parallel line drawings, based on the respective diameters of the pipe to be cut and the pipe to which it is to be joined as well as the wall thickness of the pipe. From this information markings on the pipe or drawings and templates are prepared, either method of procedure being tedious and time consuming and a necessary part of the work, and often results in errors in calculation and expensive corrections on the work is required. Machines have been developed to accomplish such cutbacks without the necessity of templates, but such machines have been extremely complicated and extremely costly, and very heavy, usually employing a series of cams and requiring heavy chucking equipment and have been for the most part confined to permanently based machines rather than portable devices feasible for one man to carry and use in the field. It is an object of this invention to provide a device inexpensive to manufacture, manually operated and readily portable by one average man into the field for on the job service, having means for performing the desired cut without the need of templates, drawings, mathematical calculations, chucks or cams, and with relatively few adjustments required by the operator.

With the above and other objects in view, the invention relates to certain novel features of construction, operation and arrangement of parts more particularly defined in the following specification and illustrated in the accompanying drawings, wherein:

FIGURE 1 is a top plan view of a saddle connection between two pipes to be joined.

FIGURE 2 is a perspective elevational view of the device.

FIGURE 3 is a top plan view of the device.

FIGURE 4 is a side elevational view of the oscillating mechanism employed.

FIGURE 5 is an enlarged end view taken on the line 3—3 of FIGURE 4 showing one of the setting means employed.

FIGURE 6 is a sectional end view of the oscillating mechanism, and

FIGURE 7 is a partial view of the chart employed as a guide in setting the device.

Referring now more particularly to the drawings, the numeral 1 designates a suitable framework, or housing, in which the rollers 2, 2 and 3, 3 are mounted on suitable bearings as 4, 4. If desired, the rollers 2, 2 may be idler rollers, cooperating with the rollers 3, 3 to form a bed on which a pipe to be cut may be mounted. Suitable handles as 5, 5 may be provided on the housing to aid in moving the device from place to place.

A manually rotated crank 6 extends through the housing 1 and through a suitable shaft bearing 7 and mounted on the crank 6 is a suitable gear, such as the worm gear 8, and the shaft of the crank 6 extends from the gear 8 through the bearing 9 and has the spur gear 10 mounted on the extreme end thereof. A shaft 11, having a suitable gear 12 in mesh with the worm gear 8, extends through the bearing 13 and has the wheel rotating gears 14, 15. The gear 14 is in rotating connection with the gear 16 as by means of the chain 17 and the gear 15 is in rotating connection with the gear 18 as by means of the chain 19. A suitable cover 20 may be employed on the housing 1.

The gear 10 is in rotating connection with the gear 21 as by the chain 22. The gear 21, which is on a ratio of two-to-one with the gear 10, is mounted on the shaft 23 which is supported at one end by the bearing 24 and which extends into the gear box 25 which contains a suitable gear transmission means to rotate the gear 26 at a ratio of one-to-two with the gear 8. A rack 27 is mounted on the rack guide 28 and is moved longitudinally by the gear 26. The rack 27 is slidably mounted on the guide 28 as by means of the brackets 29, 29. The outer end of the rack 27 has the traveling connecting link 30 which is pivotally mounted on the rack 27 as by a shoulder bolt 73 and which is slidably mounted on the guide 31 and the link 30 may be provided with suitable non friction means such as the roller 32, in contact with the guide 31. The guide 31 is pivotally connected adjacent one end to the oscillating bar 33 as by means of the pin 74 and at a point approximately midway of the end thereof has a pivotal connection with the arm 75 which is adjustably secured to the oscillating bar 33. The bar 33 is provided with indicia for setting the device for pipe of various sizes and the wing nut 34 anchors the arm 75 to the bar 33 at the desired setting.

A suitable support as 35 is mounted on the side of the housing 1 and has suitable non-friction means as the rollers 36, 36 acting as bearings for the bar 33, to permit its longitudinal movement through the support 35. The arm 37 is pivotally connected to the extended end of the guide 31 by means of the parallel bar 74 and at the other end is pivotally connected to the bar 33 adjacent the portion thereof forming the rack 38. A pinion 39 is mounted in the bearings 40, and is in mesh with the rack 38 and rotates the shaft 41 and large gear 42 which in turn rotates the gear 43 and shaft 44 mounted in the bearings 45, 45 and rotates the worm gear 46 which is in mesh with and rotates the gear 47 and shaft 48 mounted in the bearing 49 and on the upper end of the shaft 48 is mounted the rotating arm 50 and the radius shaft 51 is slidably mounted on the arm 50 so that the circumference of rotation of the shaft 51 may be varied by suitable anchoring means such as the wing nut adjustment 68. The shaft 48 is supported by the pivotally mounted supporting means 52 which is releasably secured to the housing extension 56 by means of the wing nut 53 and is mounted in suitable bearings as 54, 54.

A carriage 55 is mounted on the housing extension 56 and has a rocking follower guide 76 mounted in the bearings 77, 77 and a series of rollers are rotatably mounted in said follower consisting of the small rollers 57, 57 and the large rollers 58, 58. The carriage also is provided with a wheel 59 on which the carriage 55 travels on the housing extension 56. The rollers 57, 58 are mounted in suitable bearings 60, 60 on the carriage 55.

The radius shaft 51 extends between the pairs of rollers 57, 57, 58, 58 and as the shaft 51 rotates, the rollers permit free movement of the carriage 55.

The carriage 55 is connected to the torch arm 61 at one end, and suitable rollers as 62, 62 permit oscillation of the torch arm 61 which extends longitudinally of the housing 1, through the support 35, where suitable rollers as 63, 63, 63 permit free movement therethrough, and on the extended end of the torch arm are the sections of adjustable links 64, 64, 64 and on the free end of the series of adjustable links is the torch holder 65 on which a suitable torch as 66 may be mounted. Suitable wing nuts as 67, 67, 67 permit adjustment of the torch to the desired position over the pipe to be cut.

In operation, a pipe to be cut, as 71, is placed on the rollers 2, 2, 3, 3 and the setting 34 is adjusted to the desired point according to the size of the pipe to be cut. The adjustments controlled by wing nuts 53, 68 are then made, as set out in the table partially shown in FIGURE 7, the wing nut 53 is set to determine the angle of tilt of the shaft 51 and in accordance with this table and the radius setting 68 determines the radius formed by the shaft 51. The links 64 are adjusted to position the torch at the desired cuting angle over the work, which should always be pointing away from the machine, and at the desired angle for proper cutting with relation to the distance from the pipe being cut, and the torch ignited. The starting position is with the rack 27 in fully retracted position, and the crank 6 is then manually rotated at the speed necessary to complete a cut upon one rotation of the pipe, causing the rollers 3, 3 to rotate the pipe being cut, and the rack 27 moving the guide 31 in turn moves the bar 33, causing the rack 38 to rotate the gear 39 and through the gear train 42, 43, 46, 47, rotate the arm 50 and the shaft 51, which will oscillate the carriage 55 and the torch arm 61, and the torch 66, so that upon one complete rotation of the shaft 51, the radius cut is completed on one-half of the circumference of the pipe. This is repeated so that upon completion of one rotation of the pipe being cut, and two complete rotations of the shaft 51, a complete saddle cut is executed.

To form the saddle in the pipe being cut by the torch 66, the radius of the saddle is determined by mathematical calculation, based on the respective diameters of the pipe to be cut and the pipe to which it is to be joined, and the wall thickness of both. The torch arm 61 moves at varying speeds in its oscillation, the speed of the arm increasing as the shaft 51 approaches the first quarter of its path of rotation; as it passes the first quarter of rotation, the speed decreases and as it passes the first half of its cycle, the travel of the carriage 55 is reversed and the variations in speed are reversed forming exactly the same pattern as the first half of the path of rotation. This completes the first radius of the saddle which is duplicated upon continued rotation of the pipe and upon one complete rotation of the pipe, the saddle cut is formed.

If it is desired to cut a miter cut, rather than a saddle cut, the adjustment 34 may be moved to a position, determined by the diameter of the pipe, and the tilt adjustment 53 is placed at zero, so that a single rotation of the shaft 51 will be synchronized with a single rotation of the pipe.

To perform a straight cut, the shaft 51 is removed from the carriage 55, and placed in the port 69 in the torch arm 61 which is moved into alignment with the locking block 70, and the shaft 51 extends into the block 70, thus disconnecting the oscillating arm 61 from the oscillating mechanism and locking the arm 61 in a fixed position, and the pipe may be rotated to complete a cut.

The rotation of the pipe being cut and the rotation of the shaft 51 and resulting oscillating movement of the torch arm 61 is adjusted so that the bar 61 moves back and forth in exact synchronization with the rotation of the pipe being cut. The ratio of rotation is determined by the adjustment of the angle between the guide 31 and the guide 28. The rollers 3, 3 being rotated at exactly the same speed as the rotation of the gear 26, which moves the rack 27, moves the gear train rotating the shaft 51 and the torch arm 61, in exact synchronization. This ratio of rotation is quickly and easily changed to accommodate various sizes of pipe connections by adjusting the wing nut 34 to determine the angle between the guides 38, 31, which replaces the necessity for use of heavy chucks, gears and cams and eliminates the necessity for templates. The theory employed is that of a constant ratio and a changing angle. The movement of the rack 30 rotates the shaft 51 and at a fixed rate, the angle between the guides 28, 31 determines the number of revolutions of the wheels 3, 3 necessary to effect a complete revolution of the pipe being cut. The synchronization between these two parts of the machine is accomplished by adjusting the angle between the guides in accordance with the diameter of the pipe being cut.

While the foregoing is considered a preferred form of the invention, it is by way of illustration only, the broad principle of the invention being defined by the appended claims.

What I claim is:

1. In a saddle cutting machine, a housing, driven wheels mounted in said housing upon which a pipe in which a saddle is to be formed is mounted, a longitudinally movable rack in said housing having a fixed guide, a torch arm movably mounted on said housing, an oscillating bar on said housing having a gear train in mesh therewith and said gear train being rotated by the movement of said bar, a movable guide pivotally mounted on said bar and a connecting link joining one end of said rack with said movable guide, adjustable means connecting one end of said movable guide with said bar by means of which the angle between said bar and movable guide may be varied, means for rotating said driven wheels and simultaneously moving said rack longitudinally, said rack moving said movable guide as the rack moves longitudinally in said housing and said movable guide moving said oscillating bar and rotating said gear train to oscillate said torch arm as the pipe to be cut rotates, the ratio of rotation between said wheels and said gear train being determined by the adjustment of said guide on said oscillating bar.

2. In a saddle cutting machine, a housing, driven wheels in said housing, a rack in said housing, means for rotating said wheels and moving said rack longitudinally, an oscillating bar mounted on said housing, a movable guide pivotally mounted on said bar, a connecting link on one end of said rack slidably mounted on said movable guide, means connecting one end of said movable guide with said oscillating bar, a gear train rotated by said bar and a rotating radius shaft rotated by said gear train, a carriage movable by said shaft and a cutting torch arm oscillated by said carriage.

3. In a saddle cutting machine, a housing, driven wheels in said housing, a rack in said housing, means for rotating said wheels and moving said rack longitudinally, an oscillating bar mounted on said housing, a movable guide pivotally mounted on said bar, a connecting link on one end of said rack slidably mounted on said movable guide, means connecting one end of said movable guide with said oscillating bar, a gear train rotated by said bar and a rotating arm having an upstanding and horizontally adjustable radius shaft, said arm being in operative connection with and rotated by said gear train, a carriage horizontally movable by said shaft and a cutting torch arm oscillated by said carriage, and means for varying the circumference of rotation of said shaft.

4. In a saddle cutting machine, a housing, driven wheels in said housing, a rack in said housing, means for rotating said wheels and moving said rack longitudinally, an oscillating bar mounted on said housing, a movable guide pivotally mounted on said bar, a connecting link on one end of said rack slidably mounted on said movable guide, means connecting one end of said movable guide with said oscillating bar, a gear train rotated by said bar and a rotating arm having an upstanding and horizontally adjustable radius shaft, said arm being in operative connection with and rotated by said gear train, and said shaft being positioned on said arm to form a cone pattern of rotation, a carriage horizontally movable by said shaft and a cutting torch arm connected with and oscillated by said carriage.

5. In a saddle cutting machine, a housing, driven wheels in said housing, a rack in said housing, means for rotating said wheels and moving said rack longitudinally, an oscillating bar mounted on said housing, a movable guide pivotally mounted on said bar, a connecting link on one end of said rack slidably mounted on said movable guide, means connecting one end of said movable guide with said oscillating bar, a gear train rotated by said bar and a rotating arm having an upstanding and horizontally adjustable radius shaft, said arm being in operative connection with and rotated by said gear train, a carriage having guide tracks mounted in said housing, a series of parallel rollers in said carriage, said radius shaft extending upwardly between said rollers to oscillate said carriage as the said arm rotates, moving said shaft in a cone pattern of rotation, a cutting torch arm mounted at one end to said carriage and a cutting torch mounted on the other end of said cutting torch arm.

References Cited in the file of this patent

UNITED STATES PATENTS

| | | |
|---|---|---|
| 694,028 | Protheroe | Feb. 25, 1902 |
| 1,907,954 | Gerber | May 9, 1933 |
| 2,477,041 | Buchman et al. | July 26, 1949 |
| 2,494,663 | Lobosco | Jan. 17, 1950 |
| 2,495,360 | Young | Jan. 24, 1950 |
| 2,726,450 | Ware | Dec. 13, 1955 |
| 2,884,791 | Enstrom | May 5, 1959 |

FOREIGN PATENTS

| | | |
|---|---|---|
| 135,962 | Australia | Dec. 27, 1933 |